(12) United States Patent
Hicks et al.

(10) Patent No.: US 8,771,593 B2
(45) Date of Patent: *Jul. 8, 2014

(54) METHOD AND DEVICE FOR PREVENTING CORROSION IN HOT WATER SYSTEMS

(75) Inventors: Peter D. Hicks, Aurora, IL (US); David A. Grattan, Bolingbrook, IL (US)

(73) Assignee: Nalco Company, Naperville, IL (US)

( * ) Notice: Subject to any disclaimer, the term of this patent is extended or adjusted under 35 U.S.C. 154(b) by 269 days.

This patent is subject to a terminal disclaimer.

(21) Appl. No.: 13/442,324

(22) Filed: Apr. 9, 2012

(65) Prior Publication Data

US 2012/0234756 A1 Sep. 20, 2012

Related U.S. Application Data

(63) Continuation-in-part of application No. 11/782,192, filed on Jul. 24, 2007, now Pat. No. 8,153,057.

(51) Int. Cl.
| | |
|---|---|
| C23F 11/00 | (2006.01) |
| A61L 2/00 | (2006.01) |
| G01N 17/00 | (2006.01) |
| C02F 1/70 | (2006.01) |
| C02F 1/72 | (2006.01) |
| C03C 23/00 | (2006.01) |
| H05F 3/00 | (2006.01) |

(52) U.S. Cl.
USPC ............ 422/7; 422/3; 422/6; 422/14; 422/23; 422/53; 422/82.04; 422/119; 422/186.06; 210/746; 210/757; 210/758; 210/696; 134/2; 204/164; 204/571

(58) Field of Classification Search
USPC .............. 422/3, 6–7, 14, 23, 53, 82.04, 119, 422/186.06; 210/746, 757, 758, 696; 134/2; 204/164, 571
See application file for complete search history.

(56) References Cited

U.S. PATENT DOCUMENTS

| | | | |
|---|---|---|---|
| 2006/0182651 A1* | 8/2006 | Bailey et al. ...................... 422/3 |
| 2008/0179179 A1* | 7/2008 | Hicks et al. ................... 204/164 |

* cited by examiner

*Primary Examiner* — Monzer R Chorbaji
(74) *Attorney, Agent, or Firm* — Edward O. Yonter

(57) ABSTRACT

Disclosed is a method of controlling a real-time oxidation-reduction potential in a hot water system to inhibit corrosion in the hot water system. The method includes defining one or more operational protective zones in the hot water system. One or more of the operational protective zones includes an oxidation-reduction potential probe that is operable to measure a real-time oxidation-reduction potential in the hot water system at operating temperature and pressure. The probe transmits the measured real-time potential to the controller, which assesses and interprets the transmitted potential to determine whether it conforms to an oxidation-reduction potential setting. If the measured potential does not conform the oxidation-reduction potential setting, the controller is operable to feed or remove one or more active chemical species into or from the hot water system and further operable to change at least one system parameter.

24 Claims, 4 Drawing Sheets

METHOD AND DEVICE FOR PREVENTING CORROSION IN HOT WATER SYSTEMS

CROSS REFERENCE TO RELATED APPLICATION

This application is a continuation in part of U.S. patent application Ser. No. 11/782,192, filed Jul. 24, 2007 now U.S. Pat. No. 8,153,057, "Method and Device for Preventing Corrosion in Hot Water Systems," the disclosure of which is incorporated herein by reference in its entirety.

TECHNICAL FIELD

This invention relates generally to methods of reducing or inhibiting corrosion in hot water systems. More specifically, the invention relates to measuring real-time oxidation-reduction potential at operating temperature and pressure in one or more operational protective zones and using those measurements to control the adjustment of parameters that affect the oxidation-reduction potential. The invention has particular relevance to locally and/or globally reducing or inhibiting corrosion in simple or complex hot water systems.

BACKGROUND

Hot water systems are generally composed of all-ferrous metallurgy or mixed metallurgy, such as copper or copper alloy systems, nickel and nickel-based alloys, and stainless steel and may also be mixed with mild steel components. Many general classes/components of hot water systems exist, such as boilers, hot water heaters, heat exchangers, steam generators, nuclear power electric systems combustion engine and diesel coolant systems, evaporator systems, thermal desalination systems, papermaking operations, fermentation processes, the like, and attached ancillary devices. They are dynamic operating systems that undergo a myriad of REDOX Stress events (i.e., any electrochemical event in the hot water system related to changes in oxidative or reductive potential). Such events generally include any process that implicates the oxidation-reduction potential ("ORP") space or regime in the system.

These events result from a multitude of factors including leaks from various components, contamination from air in-leakage, malfunctioning pumps, seals, vacuum lines, and gauges. Further, increased use of oxygen-enriched water, such as boiler make-up water, returned steam condensate, and/or raw surface or subsurface water, deaerator malfunctions, steam and turbine load swings, and problems with chemical feed pumps cause unplanned reduction or increase in chemical treatment feed rates. Uncontrolled REDOX Stress events can cause serious corrosion problems, such as localized corrosion, stress corrosion, corrosion fatigue, and/or flow accelerated corrosion problems in hot water systems. By their nature, these problems tend to be electrochemical and thus tied-in to the oxidative-reductive properties of the environment and structural material interaction.

Although some conventional methods are practiced today to identify REDOX Stress events in hot water systems, because of hot water system dynamics most REDOX Stress events are unpredictable. These methods are not widely practiced because they have inherent drawbacks (see below). As a consequence, the majority of REDOX Stress events go undetected and thus uncorrected. Uncontrolled REDOX Stress events can lead to serious corrosion problems in these systems, which negatively impact plant equipment life expectancy, reliability, production capability, safety, environmental regulations, capital outlay, and total plant operation costs.

Identifying REDOX Stress events currently includes both online instruments and grab sample wet chemical analysis test methods. In both approaches, the sample has to first undergo sample conditioning, such as cooling, prior to measurement. Examples of online instruments include dissolved oxygen meters, cation conductivity instruments, room temperature ORP instruments, pH instruments, sodium analyzers, hardness analyzers, specific conductivity meters, silica analyzers, particle and turbidity meters, reductant analyzers, and the like. General corrosion monitoring, such as coupon and electrochemical analysis, is typically performed after cooling a sample or at elevated temperatures. Grab sample test methods include analyzing for dissolved oxygen, pH, hardness, silica conductivity, total and soluble iron, copper, and silica, reductant excess, and the like.

Some drawbacks of these methods include the following. Grab sample analysis gives a single point in time measurement and consequently is not a viable continuous monitoring method for REDOX Stress events. It also often has inadequately low-level detection limits. Online monitors do not provide a direct measurement of REDOX Stress and thus cannot indicate whether or not a REDOX Stress event is occurring at any particular time. Corrosion monitors detect general corrosion, but are not capable of measuring changes in local corrosion rates caused by REDOX Stress events. Online reductant analyzers measure the amount of reductant, but not the net REDOX Stress a system is undergoing at system temperature and pressure. That REDOX Stress can occur in the apparent presence of a reductant is thus another drawback of this technique.

Dissolved oxygen ("DO") meters have similar drawbacks. Measuring the amount of DO (an oxidant) but not necessarily the net REDOX Stress a system is undergoing is not an accurate indicator of corrosion stress. The sample also must be cooled prior to DO measurement thus increasing the lag time in detecting when the REDOX Stress event started. Further, the potential for oxygen consumption in the sample line could cause inaccurate readings. REDOX Stress can also occur in the apparent absence of DO and little or no DO in the sample could potentially be a false negative. In addition, all of the instruments described above are relatively costly to purchase, and require frequent calibration and maintenance.

Corrosion coupons give a time-averaged result of general system corrosion. Again, this technique does not offer a real-time indication or control of REDOX Stress events. Online electrochemical corrosion tools are inadequate for localized corrosion determinations and cannot be used in low conductivity environments.

Room temperature ORP is a direct measurement of the net ORP of a sample taken from the system. A drawback of this technique is that it fails to indicate what is happening at system temperature and pressure. REDOX Stress events that occur at operating temperature and pressure often cannot be observed at room temperature, as process kinetics and thermodynamics vary with temperature. In addition, room temperature ORP measuring devices are more sluggish and more likely to become polarized. Reliability of such devices is poor and they need frequent calibration and maintenance.

There thus exists an ongoing need to develop methods of accurately monitoring and controlling real-time ORP in hot water systems at operating temperature and pressure.

SUMMARY

This disclosure accordingly provides a method of monitoring and controlling ORP in a hot water system in real-time at operating temperature and pressure. A myriad of processes occurring in a hot water system contribute to the ORP, which in turn acts as a REDOX Stress indicator for the hot water system. In contrast to conventional room temperature measurements, ORP measurements taken in real-time at system operating temperature and pressure are capable of indicating primary and secondary REDOX Stress events occurring in the system in real-time. Such real-time ORP monitoring may be used to measure, identify, and assess REDOX Stress demands in the system and can act as a direct or indirect corrosion process indicator.

In an aspect, the invention provides a method of controlling a real-time ORP in a hot water system to reduce or inhibit corrosion in the hot water system. The method includes defining one or more operational protective zones ("zone" or "zones") in the hot water system. At least one (e.g., one two or more) of the defined zones is selected and one or more (e.g., one, two, or more) of the selected zones includes at least one ORP probe operable to measure the real-time ORP and communicate with a controller. The real-time ORP is measured either continuously or intermittently at one or more (e.g., one, two, or more) of the selected zones while the hot water system is at operating temperature and pressure. The method further includes transmitting the measured real-time ORP to the controller and assessing whether the measured real-time ORP or a calculated ORP based upon the measured real-time ORP conforms to an ORP setting. The ORP setting may either be a same ORP setting for each of the selected zones or a different ORP setting for at least two of the selected zones. If the measured real-time ORP or the calculated ORP does not conform to the ORP setting, the method includes changing a parameter in the hot water system. In an embodiment, the method includes performing at least one of the following actions if the measured real-time ORP or the calculated ORP does not conform to the ORP setting: (i) feeding an effective amount of one or more active chemical species into the hot water system, (ii) removing an effective amount of one or more active chemical species from the hot water system, and (iii) changing a system parameter.

In another aspect, the invention provides a corrosion control device for a hot water system. The hot water system has one or more (e.g., one, two, or more) operational protective zones, where a subset of the zones (preferably two or more zones) is selected. In an embodiment, the device includes a receiver that is in communication with one or more ORP probes. A subset of the ORP probes is activated and each activated ORP probe is operable to measure a real-time ORP at operating temperature and pressure. At least one ORP probe is installed at one or more of the selected zones. In an embodiment, the device also includes a processor operable to interpret the measured real-time ORP communicated to the receiver from each activated ORP probe. The processor interprets either the measured real-time ORP directly or a calculated ORP based upon the measured real-time ORP. In an embodiment, the corrosion control device is operable to change or adjust a parameter based upon one or more iterations of the measured and interpreted ORP.

According to at least one embodiment, in communication with a transmitter is a feeding device that is operable to manage introduction of one or more active chemical species into the hot water system to affect changes in the real-time ORP. In at least one embodiment, a chemical removal device operable to remove one, two, or more chemical species from the hot water system is in communication with the corrosion control device. The processor is operable to send an output signal through the transmitter to the feeding device or the chemical removal device, if the interpreted real-time ORP does not conform to an ORP setting.

It is an advantage of the invention to provide a method of inhibiting corrosion in a hot water system based upon measuring a real-time ORP at operating temperature and pressure in the hot water system and reacting to the measured ORP by feeding one or more active chemical species into the hot water system to maintain an ORP setting.

Another advantage of the invention is to provide a hot water system corrosion control device including a receiver, a processor, a transmitter, and a feeding device, which work in unison to control a real-time ORP in one or more operational protective zones in the hot water system.

A further advantage of the invention is to increase hot water system efficiency by enabling improved maintenance and control of system parameters.

Yet another advantage of the invention is to decrease operating costs for a variety of hot water systems and components by accurately preventing corrosion.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION

Figure 1:
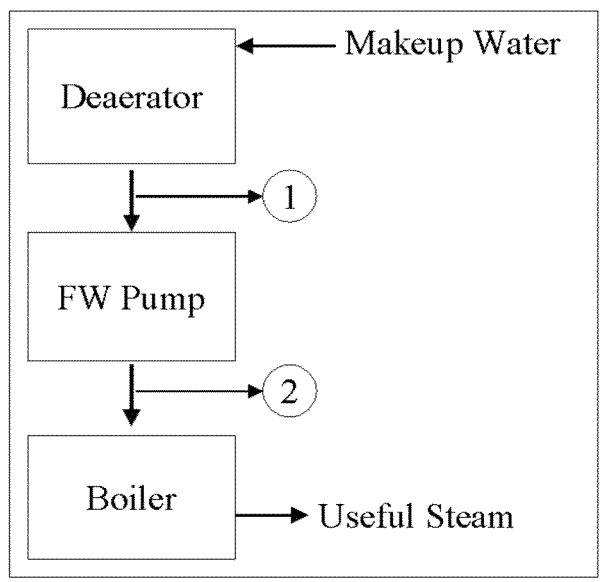
FIG. 1 depicts a simplified 3-component hot water system, where make-up water flows through a "Deaerator," a "FW Pump," and into a "Boiler" and the boiler in turn generates "Useful Steam" for subsequent use in various processes.

As used herein, "hot water system," "system," and like terms refer to any system where hot water is in contact with metallic surfaces. "Hot water" means water having a temperature from about 37° C. up to about 370° C. The system may operate at or below atmospheric pressure or a pressure up to about 4,000 psi.

"ORP," "@T ORP," "at-T ORP," and "real-time ORP" refer to oxidation-reduction potential for an industrial water system at operating temperature and pressure. In certain instances herein, ORP is indicated as room temperature ORP.

"ORP probe" refers to any device capable of measuring and transmitting a real-time ORP signal. Though any suitable device may be used, a preferred device is disclosed in U.S. patent application Ser. No. 11/668,048, filed "High Temperature and Pressure Oxidation-Reduction Potential Measuring and Monitoring Device for Hot Water Systems," now pending, which is incorporated herein by reference in its entirety. Typically, the ORP probe includes a temperature detector, a noble metal electrode, and a reference electrode.

"Active chemical species" refers to oxidants, reductants, corrosion-inhibitors, corrodants, and other species that have an affect on or influence the ORP in a hot water system. Such species are described in more detail below.

"REDOX Stress" refers to any electrochemical event in a hot water system related to changes in oxidative or reductive potential, either directly or indirectly.

"Controller system," "controller," and similar terms refer to a manual operator or an electronic device having components such as a processor, memory device, digital storage medium, cathode ray tube, liquid crystal display, plasma display, touch screen, or other monitor, and/or other components. In certain instances, the controller may be operable for integration with one or more application-specific integrated circuits, programs, computer-executable instructions, or algorithms, one or more hard-wired devices, wireless devices, and/or one or more mechanical devices. Some or all of the controller system functions may be at a central location, such as a network server, for communication over a local area network, wide area network, wireless network, internet connection, microwave link, infrared link, and the like. In addition, other components such as a signal conditioner or system monitor may be included to facilitate signal-processing algorithms.

In one embodiment, the method includes an automated controller. In another embodiment, the controller is manual or semi-manual, where an operator interprets the signals and determines feed water ("FW") chemistry, such as oxygen or other oxidant, oxygen scavenger or other reductant, corrosion-inhibitor, and/or corrodant dosage. In an embodiment, the measured ORP signal is interpreted by a controller system that controls FW chemistry according to the described method. In an embodiment, the controller system also interprets measured temperature to determine the amount of active chemical to add or remove, if any. The controller system is also operable to determine if changing or adjusting a system parameter is needed in addition to or instead of adding or removing one or more chemical species from the hot water system. The temperature detector might also be used for information purposes, such as in alarm schemes and/or control schemes. It should be appreciated that the control scheme may incorporate pump limiters, alarming, intelligent control, and/or the like, based off further inputs, such as pH, DO levels, and other water constituents/properties.

It is contemplated that the disclosed method is applicable in a variety of hot water systems, including both direct and satellite active chemical feeding designs. "Direct" feeding typically refers to measuring real-time ORP at a zone and feeding active chemical to the same zone. "Satellite" feeding usually refers to measuring real-time ORP at a zone and feeding active chemical to a different zone. Representative systems and system components include condensers, both tube and shell side; heat exchangers; pumps; seals; mild steel or copper-based FW heaters; copper-based alloy surface condensers; dearators; water tube and fire tube boilers; paper machines; condensate receivers; steam condensate transfer lines with or without steam traps; process liquid heat exchangers; evaporators; desalination systems; sweet-water condensers; attemperated water sources; flow-accelerated corrosion protection; air heaters; engine coolant systems for diesel and gasoline; and the like.

Other exemplary processes include papermaking process, such as Kraft pulping and bleaching processes; wafer polishing and planarization processes (e.g., silicon wafer polishing); combustion gas emission (e.g., $SO_2$, $NO_x$, mercury); fermentation processes; geothermal processes; and aqueous organic redox synthesis (i.e., polymerization processes that require redox initiators).

Conventional corrosion control regimes use one point feed. The disclosed invention uses targeted feed by precisely determining the needed active chemicals and the proper amount/dosage of those chemicals. For example, relatively oxidizing zones, such as low-pressure FW heaters (copper-based metallurgy), and more reducing zones, with high-pressure FW heaters (non copper-based metallurgy), may be differentiated to alleviate flow-accelerated corrosion-related issues. Relatively oxidizing conditions within all ferrous FW heaters at sections of pressurized water reactors versus relatively reducing final FW heater regimes for stress corrosion cracking mitigation in steam generators.

The invention is capable of detecting and reacting to both primary and secondary REDOX Stress events. Typically, the implementer knows the system corrosion control implications and possible REDOX stressors and is able to accordingly select one or more of the defined operational protective zones to appropriately monitor a given system's @T ORP space. In this way, it is possible to control corrosion by feeding or removing REDOX active species based off local and/or remote @T ORP readings as a primary REDOX Stress indicator. The @T ORP space is monitored and measured to assess and identify system demands, which are then compared to known/formulated metrics to react, solve, and control REDOX Stress events. As an indicator of secondary REDOX Stress, the invention can detect corrosion processes resulting from prior, primary REDOX Stress, where the primary REDOX stressor is no longer evident.

The ORP probe may detect several different factors that contribute to REDOX Stress events in the hot water system. For example, an ORP probe in a selected zone can act as a direct indicator of corrosion in that zone or in another zone. In an embodiment, the real-time ORP is measured in a first selected zone and one or more active chemical species are fed to the first selected zone, if the measured real-time ORP at the first selected zone or the calculated ORP does not conform to the ORP setting for the first selected zone. In another embodiment, the real-time ORP is measured at a first selected zone and one or more active chemical species are fed at one or more other selected zones, if the measured real-time ORP or the calculated ORP does not conform to the ORP setting for the first selected zone. In a further embodiment, one or more real-time ORPs are measured at one or more of the selected zones and one or more other real-time ORPs are calculated for one or more other selected zones, based upon one or more of the measured real-time ORP(s).

As described above, in some cases, the measured ORP in a first zone is used to calculate an ORP for another zone. Such calculations may be done by making various assumptions regarding system dynamics or by measuring temperature/water chemistry differences between zones. Using mixed potential theory and thermodynamic principles known to those skilled in the art also allows for approximating conditions in other zones. However, such calculations are typically subject to inherent inaccuracies; thus, the preferred method is to measure the real-time ORP in situ in selected zones.

Several important factors exist for determining or defining specific operational protective/control zones for a system. The goal for any particular system is to achieve @T ORP "Plant Specific Boiler Best Practices" for that system. For instance, certain plants are limited to certain chemistries due to control philosophy, environmental constraints, economics, industry standards, etc. System temperatures also may dramatically vary from one plant to another, which requires adjusting the specific control philosophy employed, explained in more detail in the below Examples. Different plants may also have a unique REDOX Stress baseline and insipient changes to the baseline may need to be determined.

Other factors include, specific ORP altering species purposefully added or inherently present; engineering alloys of construction for various portions/entities in the system; desired general and local corrosion mitigation; dosing limitations; other system design specifics; special considerations, such as flow-accelerated corrosion, stress, and corrosion cracking; system variability. Those skilled in the art would understand how to assess these and other system variables/specifics to implement the invention for a specific plant or system.

Ideally, any portion of a plant can have its @T ORP REDOX Stress measured and controlled using @T ORP. That is, the REDOX active species is fed directly to a specific piece of equipment (or groups of equipment) and the @T ORP of the water in that piece of equipment is measured in situ and controlled for corrosion mitigation. This invention more specifically addresses corrosion local to the part(s) being protected and transport of corrosion products with concomitant deleterious effects of that corrosion transport elsewhere in the system, including fouling, heat transfer surface coating, turbine deposition, etc. This type of full equipment monitoring and control approach is often not possible due to system limitations and economics. As such, parts of systems typically need to be handled as whole entities. In some cases, the entire feed water train of a boiler system might be the entity. Alternatively, only small portions of the system or groups of portions of the system are the entity. It is contemplated that any portion, component, or entity (including the entire system viewed as one entity) may be selected and monitored/controlled.

In an aspect, the ORP setting for one selected zone may overlap with another defined or selected zone. In another aspect, the ORP setting for one selected zone is completely independent of each and every other defined or selected zone. In a further aspect, the ORP setting for one selected zone is partially dependent upon factors in one or more other defined or selected zones.

In an embodiment, the ORP setting is determined for a first selected zone and additional ORP settings are optionally determined for additional selected zones, if any. In one embodiment, each additional ORP setting is independently determined. Alternatively, one or more of the ORP settings may be dependent upon one or more other ORP settings. ORP settings are generally dependent and based upon operational limitations of the hot water system.

Determining the ORP setting for any particular system may be accomplished by any suitable method. A preferred method is described in U.S. Pat. No. 7,666,312, "Method of Inhibiting Corrosion in Industrial Hot Water Systems by Monitoring and Controlling Oxidant/Reductant Feed through a Nonlinear Control Algorithm," which is incorporated herein by reference in its entirety. It is contemplated, however, that any method known to those skilled in the art may be employed to ascertain the ORP setting. In an embodiment, the ORP setting is an ORP set point that is chosen from one or more single values. In another embodiment, the ORP setting is an ORP set range chosen from one or more ranges of values. Over time, the ORP setting for any selected zone may be adjusted or changed. For example, a given plant may have a timetable outlining ORP settings for different parts/components of the system at different times. This timetable would typically be based upon operational factors in the system that may change as demands on the system change.

Some zones might be kept relatively reducing and other zones might be relatively more oxidizing. For example, referring to FIG. 2, Heat Exchangers 1 and 2 might be manufactured from an alloy that exhibits low corrosion rates under more reducing conditions. Whereas, Heat Exchanger 3 might be manufactured from a different metallurgy that exhibits lower corrosion rates under more oxidizing conditions. The "Steam Producer" might then again need to be kept under more reducing conditions. The @T ORP control zones would be accordingly adjusted and monitored to compensate for these differences.

In one embodiment, one or more of the selected zones may be in a monitoring and/or alarm mode, while one or more other selected zones is in a control mode. A selected zone in a monitoring and/or alarm mode is capable, in an embodiment, of switching between these modes. Such switching may either be manually controlled or automatic. Several examples are presented below of how @T ORP™ system design can be used for REDOX stress control.

In another embodiment, the @T ORP is measured across any pump to detect pump or seal corrosion or failure. In another embodiment, the method may be used to detect heat exchanger tube leaks as one active chemical species might transfer through the leak in the heat exchanger to the other side (e.g., shell side to tube side or visa versa). Another example would be a surface condenser cooling water leak into a FW condensate hot well. In a further embodiment, the method may be used to detect any unwanted intrusion of external active chemical species (i.e., system contaminants). In an alternative embodiment, @T ORP can be used to form a "fingerprint" of specific REDOX stressors in a system. In this way, it can be used as an early warning system for boiler tube rupture as more boiler makeup water is added to the system from time to time with a concomitant increase in the REDOX stress.

Measured or calculated ORP values may indicate amounts of electrochemically active species in one or more of the selected zones. Such an indication may either be directly seen in the zone where the ORP was measured or inferred in another zone where the ORP was not directly measured. In certain cases, the measured or calculated ORP indicates an amount of chemical that indirectly affects an amount of electrochemically active species in one or more selected zones. In a more typical case, the electrochemically active species directly influences the measured or calculated ORP.

In one embodiment, the method includes ramping from one of the selected zones to another one of the selected zones after a triggering event. Any event that causes a shift or change in the real-time ORP in one or more control zones may be a triggering event. A person having ordinary skill in the art would be able to analyze such options and choose one or more triggering events for a system. For example, bringing pumps or other parts of the system online (or taking offline) may be a triggering event. Steam pressure changes due to downstream use changes, such as between turbine driving and other lower pressure uses, may also be chosen as a triggering event. Triggering may also be based on activating various condensate streams, which could introduce specific REDOX stressors in the system. Such triggering events could be detected by probes, relays, monitors, etc., while remaining detectable by changes in the real-time ORP in one or more control zones. Moreover, the rate of change of these and other events may dictate the ramping rate from one control zone to another control zone, including instantaneous, timed, stepwise, or other suitable ramping modes.

Representative triggering events may also include numerous timed operations or timetables or other plant dynamics. A timetable could be a fixed startup time followed by ramp up in some system operations over time. For example, 30 minutes after initiating FW flow, the real-time ORP should be within 100 mV of the desired ORP setting. After 20 minutes of full load firing of the boiler, the real-time ORP should be ramped up to the ORP setting. The ramping may also be triggered when an ORP setting has been achieved elsewhere in the system, such as upstream components. For example, once an upstream control zone has achieved its ORP setting (or is within, for instance, 50 mV), a downstream control zone is activated or brought into a control mode. Such sequencing of real-time ORP control is one preferred method of triggering.

Changing plant dynamics may also initiate triggering and/or ramping. In an embodiment, the triggering event can include plant power output changes. For example, a 5% power output decrease may be the triggering event that initiates real-time ORP changes in one or more control zones in the system. The procedure used to initiate the real-time ORP changes might be, for example, an immediate signal to change the ORP setting for one or more control zones or a gradual ramp to a new ORP setting. This procedure may be based upon the rate or magnitude of power decline. Furthermore, the triggering and/or ramping mechanisms might be complex interconnections of multiple signals and timing.

In a preferred embodiment, changes and adjustments to FW chemistry includes adding or removing (when possible) oxygen or other oxidant, oxygen scavenger or other reductant, corrosion-inhibitor, corrodant, and/or other active chemicals to the FW. By definition, oxygen scavengers are reducing agents, although not all reducing agents are necessarily oxygen scavengers. Reducing agents, suitable as oxygen scavengers, satisfy the thermodynamic requirements that an exothermic heat of reaction exists with oxygen. For practical applications, reasonable reactivity is typically required at low temperatures. That is, there should be some favorable kinetics of reaction. Furthermore, other changes and adjustments to FW chemistry, such as for system control and corrosion control may include adding/removing other oxidizing agents (oxidants), other reducing agents (reductants), and/or other active or inert chemicals.

It is also highly desirable that the reducing agent and its oxidation products are not corrosive and do not form products that are corrosive when they form in steam generating equipment. Typically, certain oxygen scavengers function optimally in certain pH ranges, temperatures, and pressures and are also affected by catalysis in one way or another. The selection of the proper oxygen scavengers for a given system can be readily determined based on the criteria discussed herein and knowledge of those skilled in the art.

Preferred reductants (i.e., oxygen scavengers) include hydrazine, sulfite, bisulfite, carbohyrazide, N,N-diethylhydroxylamine, hydroquinone, erythorbate or erythorbic acid, methyl ethyl ketoxime, hydroxylamine, tartronic acid, ethoxyquin, methyltetrazone, tetramethylphenylenediamine, semicarbazides, diethylaminoethanol, monoethanolamine, 2-ketogluconate, ascorbic acid, borohydrides, N-isopropylhydroxylamine, gallic acid, dihydroxyacetone, tannic acid and its derivatives, food-grade antioxidants, the like, and any combinations. It should be appreciated that any active chemical species may be used in the method of the invention.

Representative oxidants include oxygen, hydrogen peroxide, organic (alkyl and aryl) peroxides and peracids, ozone, quinone, acid and base forms of nitrates and nitrites, the like, and combinations.

Representative corrodants include mineral acids (e.g., HCl, $H_2SO_4$, $HNO_3$, $H_3PO_4$) and their salts/derivatives; caustics (e.g., Na, K, Li, hydroxides); ammonium hydroxide; chelants, such as EDTA, NTA, HEDP; phosphonic acid and polyphosphonic acids; phosphonates; water soluble and/or dispersable organic polymeric complexing agents, such as acrylic acid homopolymers, copolymers, and terpolymers; acrylamide; acrylonitrile; methacrylic acid; styrene sulfonic acids; the like; and combinations.

Representative corrosion inhibitors include alkali and amine salts of phosphate and polyphosphates; neutralizing amines; molybdates; tungstates; borates; benzoates; filming inhibitors, such as alkyl, alkenyl, and aryl polyamines and their derivatives; surfactant compositions, such as that disclosed in U.S. Pat. No. 5,849,220; oligomeric phosphinosuccinic acid chemistries, such as that disclosed in U.S. Pat. No. 5,023,000; the like; and combinations.

In another embodiment of the invention, one or more chemical species are removed from the hot water system. For example, oxygen may be removed from a main process water sidestream via a membrane process. Any suitable membrane may be used for such removal and one skilled in the art would select a suitable membrane and sidestream procedure. Nitrogen or a lower oxygen concentration carrier gas (or main process water sidestream) may be present on one side of a gas permeable membrane and the process water is on the other side of the membrane. The oxygen present in the main process water sidestream would diffuse out of the main process water sidestream to equilibrate its partial pressure across the membrane which would then lower the oxygen content in the main process water and lower the ORP. In an embodiment, a deaerator (see e.g., the configuration of FIG. 1) or similar deaeration process may be incorporated to mechanically remove or strip non-condensable gases (e.g., oxygen) out of the main system with counter flowing steam (having a lower dissolved oxygen value). The main system flow thus has its ORP lowered by the lowering of its inherent dissolved oxygen value. Such removal of chemical species may occur without or in conjunction with the addition of other chemical species into the hot water system.

In another embodiment of the invention, a non-chemical technique to change at least one system parameter may be used either alone or in conjunction with chemical addition/removal to adjust or conform the measured ORP. The ORP in any one actual zone (or linked zone) might be affected by non-chemical-addition techniques, upstream of the ORP control zone. Representative non-chemical techniques and system parameters include, for example, choosing a particular type of feed pump or condensate pump; partitioning flow of the system process stream; blending or combining streams; selecting materials of construction of various parts of the hot water system to control the rate of oxidation; cathodic protection; electromagnetic wave production; physical property changes; the like; and combinations thereof.

The foregoing may be better understood by reference to the following examples, which are intended for illustrative purposes and are not intended to limit the scope of the invention or its application in any way.

EXAMPLE 1

FIG. 1 depicts a simplified 3-component hot water system. Make-up water flows through a "Deaerator," a "FW Pump," and into a "Boiler." The boiler in turn generates "Useful Steam" that is used for various downstream processes. In this Example, ORP may be monitored/controlled at the Deaerator exit, labeled as "1" in FIG. 1, or at the FW Pump exit, labeled as "2" in FIG. 1. REDOX Stress may be reacted to in real-time as it occurs in the Deaerator and/or FW Pump independently. Active chemical species may also be fed into the Deaerator, after the Deaerator, and/or after the FW Pump for more specific corrosion control.

EXAMPLE 2

Figure 2:
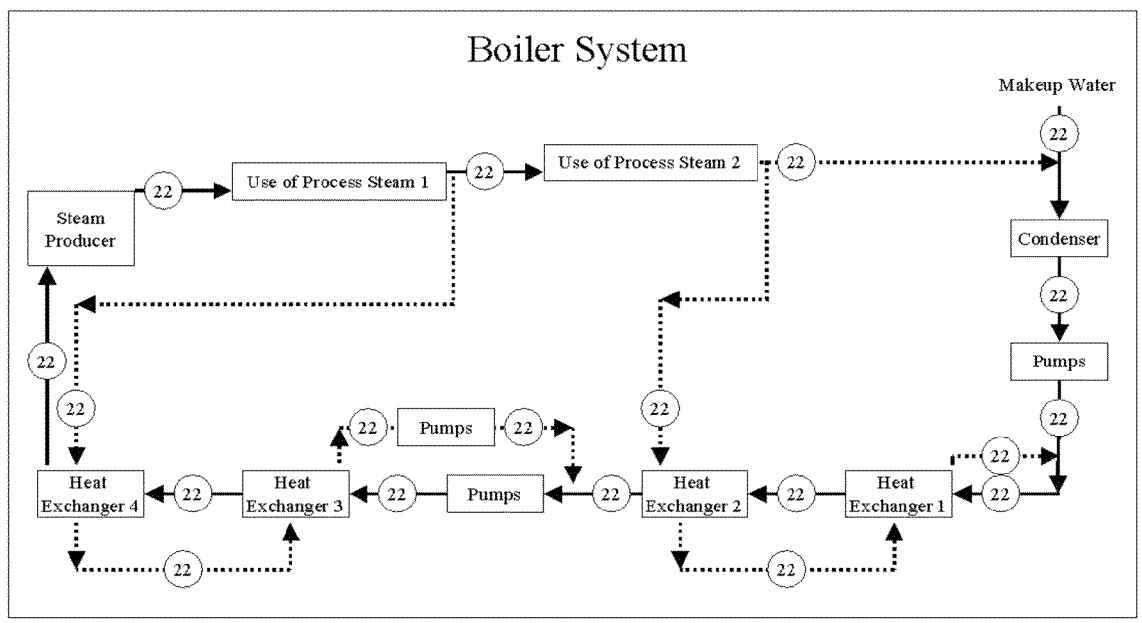
FIG. 2 illustrates a more complex boiler configuration, including a plurality of feed water pumps, a plurality of heat exchangers, and a steam producer

FIG. 2 illustrates a more complex boiler configuration, including a plurality of feed water pumps, a plurality of heat exchangers, and a steam producer (i.e., boiler). In such a configuration, any number (i.e., one two or more) of condensers, heat exchangers, pumps, boilers, process steam applications, etc. could be used. In FIG. 2, flowing feed water is shown as solid arrowed lines as it moves toward the "Use of Process Steam" areas 1 and 2. Condensed steam is shown as dotted arrowed lines as it is fed to various plant locations, which could include the shell side of heat exchangers or directly back to the condensate areas. If desired, condensate that does not meet plant water specifications for boiler feed water could be drained out of the system as blow down.

Examples of positions where ORP could be monitored/controlled and/or feed locations for active chemical species are labeled as "22" in FIG. 2. Such user-controlled positioning allows local corrosion protection capabilities for a specific units and/or groups of units as well as global corrosion protection.

EXAMPLE 3

Figure 3:
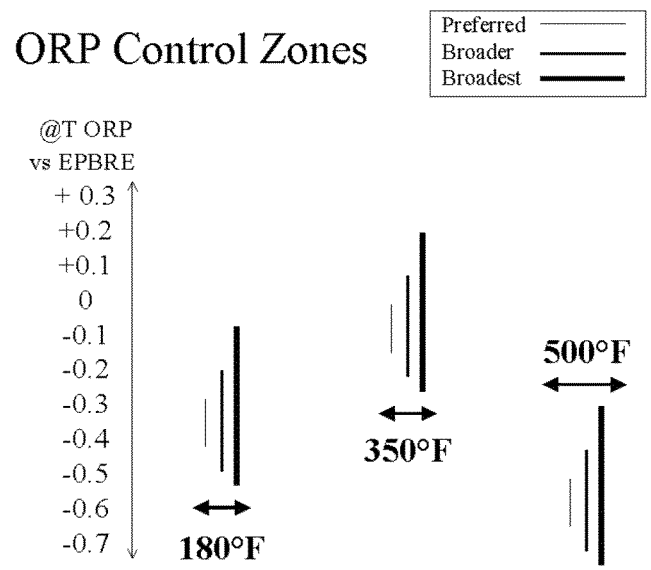
FIG. 3 depicts various "ORP Control Zones," where the ORP setting may be different for systems at various temperatures.

FIG. 3 depicts how the ORP setting may be different for systems at different temperatures. The temperatures shown in FIG. 3 may represent, for example, different plants or different operational protective/control zones in the same plant. In this Example, the ORP setting is an ORP set range selected from a series of ranges, shown as vertical lines labeled "Preferred," "Broader," and "Broadest." Depending upon the sophistication of equipment in the plant (i.e., operational limitations), the useable ORP set range or point may vary. That is, some plants are able to handle a narrow, or preferred, ORP set range, whereas other plants are able to handle only a broader ORP set range.

The @T ORP numbers would typically be recorded against an external pressure balanced reference electrode (designated as "EPBRE" in FIG. 3) having 0.1 normal potassium chloride filling solution. The first 180° F. control zone might be measured and controlled by an @T ORP probe positioned after "Heat Exchanger 2" (FIG. 2) in the feed water, and the active chemical species might be fed into the feed water just after the "Condenser" (FIG. 2) in the feed water.

The second 350° F. control zone might be measured and controlled by an @T ORP probe positioned after "Heat Exchanger 3" (FIG. 2) in the feed water, and the active chemical species might be fed into the feed water just prior to "Heat Exchanger 3" (FIG. 2) in the feed water.

The third 500° F. control zone might be measured and controlled by an @T ORP probe positioned after "Heat Exchanger 4" (FIG. 2) in the feed water, and the active chemical species might be fed into the feed water just prior to "Heat Exchanger 4" (FIG. 2) in the feed water.

EXAMPLE 4

Figure 4:
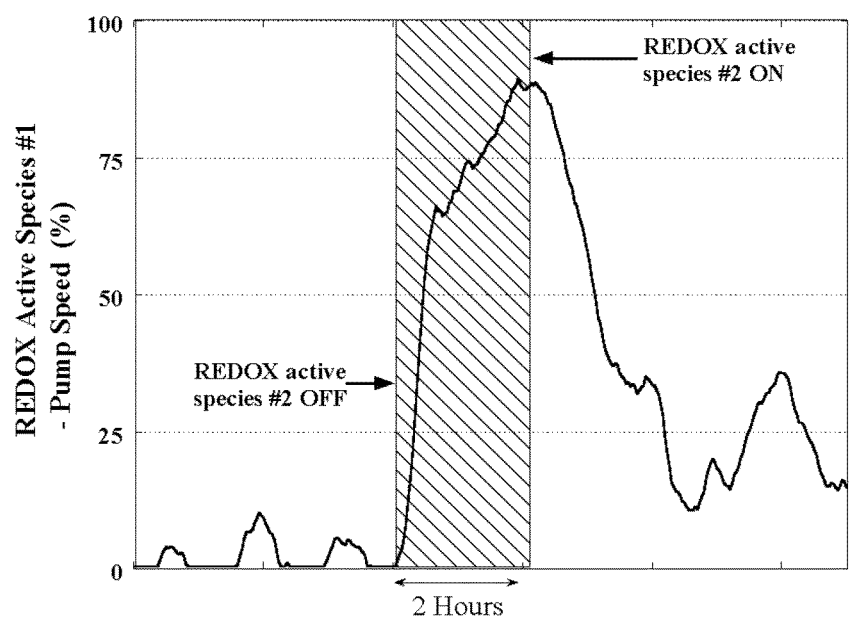
FIG. 4 illustrates feeding multiple REDOX active species at various locations to control the @T ORP® (trademark of Nalco Company) at a single location.

This Example illustrates feeding multiple REDOX active species at various locations to control the @T ORP at a single location, as shown in FIG. 4. The controlling @T ORP probe was placed directly upstream of the feed location for REDOX active species #2. The @T ORP probe was used to measure the @T ORP prior to the feed of REDOX active species #2. The @T ORP probe was then switched to control the feed of another REDOX active species (#1), being fed upstream of the single @T ORP probe. It should be noted that when REDOX active species #2 (that was being manually controlled) was turned off, the effect of that loss quickly permeated the plant water chemistry and was sensed by the @T ORP probe. The controller (in this Example, the controller was automated for REDOX active species #1) immediately initiated additional feed of REDOX active species #1 to make-up for the shortfall in REDOX active species #2.

The controlled feed of REDOX active species #1 was able to achieve and maintain the @T ORP setting thus minimizing corrosion in the heat exchangers during this event. Note that as soon as the REDOX active species #2 was manually turned back on, the corrosion control device (i.e., the @T ORP probe system) immediately compensated by cutting feed of REDOX active species #1 to maintain the desired @T ORP setting for corrosion control.

EXAMPLE 5

This Example illustrates an unpredicted response of the @T ORP™ probe to measure corrosion events directly and how real-time ORP measurements act as a direct indicator of corrosion in hot water systems from REDOX Stress events.

The @T ORP probe reacts to the formation of corrosion products in the FW. The REDOX stresses in the FW include the complex conjugate ionic corrosion pairs like $Fe^{2+}/Fe^{3+}$ or $Cu^+/Cu^{2+}$, for example. In an all iron-based FW heater, water of high DO (i.e., greater than 500 ppb) starts to enter the FW heater. The room temperature ORP and real-time ORP at the heater inlet were initially −125 mV and −280 mV, respectively. On experiencing the added REDOX stress event, the room temperature ORP and real-time ORP at the heater inlet rose to −70 mV and −30 mV, respectively. The sensitivity of the @T ORP probe (real-time ORP increases 250 mV) is clearly seen as compared to the room temperature ORP probe (increased only 55 mV). The real-time and room temperature ORP probes at the FW heater exit were initially −540 mV and −280 mV, respectively. After the high REDOX stress event the real-time and room temperature ORP probes at the FW heater exit became −140 and 280 mV, respectively. It is important to note that the real-time ORP rose by 400 mV, whereas the room temperature ORP showed no change.

It is not intended to be bound to any particularly theory; however, one theory that the room temperature ORP measurements at the exit of the FW heater showed no change was that the DO exiting the FW heater remained unchanged throughout the DO ingress event at the inlet of the FW heater. The reason the real-time ORP numbers rose so dramatically at the FW heater exit was most likely because of the corrosion that had occurred in the FW heater itself. This event generated a plentiful supply of ionic oxidized iron species, which the @T ORP probe detected, but the room temperature ORP probe did not.

The same effect was seen across copper based FW heaters where the dissolved oxygen was consumed within the FW heaters. Once again, room temperature ORP measurements showed no change at the exit of the FW heaters, but @T ORP probe responses showed elevated numbers as oxidized copper ionic species (conjugate pairs) were released into the FW and exited the FW heater, only to be sensed by the @T ORP probes and not the room temperature ORP instruments.

EXAMPLE 6

Non-Chemical Techniques

The paragraphs below provide several examples of non-chemical techniques to change a system parameter that could be used to control measured ORP in a hot water system. One of skill in the art would be able to utilize these techniques without undue experimentation.

Pump Choice: Pumps can be notoriously bad actors for air ingress (often an undesirable affect) and can add to redox stress in systems. Depending on whether such ingress was desired or conversely its exclusion was desired the choice of feed pump or condensate pump type could affect the ORP measurements quite drastically. For example, pump design parameters, such as piston packing, check valves, diaphragms, seals, glands, impellers, etc. are all zones of possible failure and air ingress. Air ingress typically occurs on the lower pressure side of a pump during the suction phase of pumping.

Partitioning: Stream flow and quantity can just be partitioned so that some or part of the system flow is diverted via sidestream to pieces of apparatus that can affect the inherent ORP and return it to the main system stream. For example, electrochemical ionization processes could be used to affect its chemical properties and thus ORP properties in the sidestream.

Blending: System or process streams with different ORP properties could be blended together in known/controlled/calculated ratios to affect the ORP and thus corrosion of the downstream system.

Materials: Separate sections of system made from different materials that could affect the ORP and corrosion properties could be incorporated and used in a specific combination to achieve the desired ORP for the hot water system. For example, a material that would have a great affinity for dissolved oxygen (e.g., any material that can actively oxidize, such as aluminum, chrome, the like, and combinations thereof, and even, more reactive would be lithium, sodium, magnesium, zinc, the like, and combinations thereof) to reduce locally the dissolved oxygen values in the process water by oxidizing at a controlled rate. Later in the process the water would then have lower ORP values and lowered propensity to corrode other materials which would then be better protected. This is somewhat similar to anodic protection except that in this case an entire zone, or piece of equipment, might be the anodic zone to protect a later zone from corrosive forces. One or more ORP-affecting species (e.g., a piece of hardware or system component) are added upstream from a later zone that requires specific ORP numbers for corrosion protection. While the pieces of hardware are generally thought to be metallic they need not be. For example activated carbon might prove to be an effective chemistry altering species, and thus ORP altering species as well.

Cathodic Protection: Impressed current similar to cathodic protection may be used to alter the ORP space whereby sections of equipment or zones contacting process water can be catholically protected. In one extreme case the cathodic protection could be run at high enough impressed electrochemical voltages to introduce chemical altering species, like hydrogen. Hydrogen would then in and of itself lower ORP values and could combine with oxygen locally (or downstream) to lower the measured ORP values.

Electromagnetic Waves: Pieces of apparatus could be in a zone of electromagnetic wave production, such as light sources, ultra-violet additions, microwave-inducing waves, the like, and combinations thereof. The electromagnetic wave sources could be on continuously or intermittently such as in a controlled fashion, pulsed, etc. The wave sources, via their specific action could be used to affect the ORP species either directly or indirectly in any zone. For example, UV light may activate a cobalt-catalyzed reaction between oxygen and sulfite in the water.

Physical Properties: Purposeful and localized changes in physical properties, for example temperature, pressure, flow, turbulence, and the like might be designed to locally affect the system ORP and thus the resultant corrosivity.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of controlling a real-time oxidation-reduction potential ("ORP") in a hot water system to reduce corrosion in the hot water system, the method comprising:
    (a) defining one or more operational protective zones ("zone" or "zones") in the hot water system;
    (b) selecting at least two of the defined zones, wherein at least two of the selected zones includes at least one ORP probe operable to measure the real-time ORP and communicate with a controller;
    (c) either intermittently or continuously measuring the real-time ORP at one or more of the selected zones while the hot water system is at operating temperature and pressure;
    (d) transmitting the measured real-time ORP to the controller;
    (e) assessing whether the measured real-time ORP or a calculated ORP based upon the measured real-time ORP conforms to an ORP setting, wherein the ORP setting is either a same ORP setting for each of the selected zones or a different ORP setting for at least two of the selected zones;

(f) performing at least one of the following actions if the measured real-time ORP or the calculated ORP does not conform to the ORP setting: (i) feeding an effective amount of one or more active chemical species into the hot water system, (ii) removing an effective amount of one or more active chemical species from the hot water system, and (iii) changing a system parameter; and (g) optionally ramping from one of the selected zones to another one of the selected zones after a triggering event.

2. The method of claim 1, wherein the ORP probe includes a temperature detector, a noble metal electrode, and a reference electrode.

3. The method of claim 1, wherein the triggering event is based upon a timetable.

4. The method of claim 1, wherein at least one of the selected zones is in a monitoring and/or alarm mode and at least one other selected zone is in a control mode.

5. The method of claim 4, wherein at least one of the selected zones is capable of switching either manually or automatically between the monitoring and/or alarm mode and the control mode.

6. The method of claim 1, wherein the ORP setting changes over time.

7. The method of claim 1, including determining a first ORP setting corresponding to a first selected zone, and optionally determining additional ORP settings corresponding to additional selected zones.

8. The method of claim 7, including independently determining the first ORP setting and/or independently determining each additional ORP setting corresponding to each additional selected zone.

9. The method of claim 1, including independently determining the ORP setting for each selected zone based upon operational limitations of the hot water system.

10. The method of claim 1, wherein the ORP setting is selected from the group consisting of: an ORP set point chosen from one or more single values and an ORP set range chosen from one or more ranges of values.

11. The method of claim 1, including measuring a first real-time ORP in a first selected zone and performing at least one of said actions to the first selected zone, if the first measured real-time ORP or a first calculated ORP based upon the first measured real-time ORP does not conform to the ORP setting for the first selected zone; and/or measuring the first real-time ORP and performing one of said actions at one or more other selected zones, if the first measured real-time ORP or the first calculated ORP does not conform to the ORP setting for the first selected zone; and/or measuring one or more real-time ORPs at one or more of the selected zones and calculating one or more other real-time ORPs for one or more other selected zones, based upon one or more of the measured real-time ORP(s).

12. The method of claim 1, wherein the measured real-time ORP or the calculated ORP indicates an amount of electrochemically active species in the respective selected zone or in another selected zone; and/or wherein the measured real-time ORP or the calculated ORP indicates an amount of a chemical that indirectly affects an amount of electrochemically active species in the respective selected zone or in another selected zone.

13. The method of claim 12, wherein the electrochemically active species directly influences the real-time ORP.

14. The method of claim 1, including automatically and/or manually performing at least one of said actions.

15. The method of claim 1, wherein the active chemical species is selected from the group consisting of: oxidants, reductants, corrosion-inhibitors, corrodants, and combinations thereof.

16. The method of claim 1, including operating the method over a network.

17. The method of claim 16, wherein the network is the Internet.

18. A digital storage medium having computer-executable instructions stored thereon, the instructions operable to execute the method of claim 1.

19. The method of claim 1, wherein the hot water system is selected from the group consisting of: fossil fuel fired water-tube or fire-tube boilers; hot water heaters; heat exchangers; steam generators; nuclear power electric systems including light water reactors, pressurized water reactors, and boiling water reactors; marine units; combustion engine and diesel coolant systems; evaporator systems; thermal desalination systems; evaporator systems; papermaking operations including pulping processes and bleaching processes; wafer polishing and planarization processes; combustion gas emissions; fermentation processes; geothermal processes; aqueous organic redox synthesis; polymerization processes; steam ejection equipment; processing operations; and ancillary devices attached thereto.

20. The method of claim 1, including removing an effective amount of oxygen from the hot water system.

21. The method of claim 20, further comprising using a gas permeable membrane to remove said oxygen.

22. The method of claim 20, further comprising using a deaerator to remove said oxygen.

23. The method of claim 1, wherein changing a system parameter comprises selecting at least one of the following actions: selecting a particular chemical feed pump design; selecting a particular condensate pump design; partitioning stream flow and quantity; blending system or process streams with different ORP properties in a controlled ratio; selecting materials of construction for operational protective zones based upon affinity for dissolved oxygen; impressing current to provide cathodic protection; introducing electromagnetic waves; adjusting physical properties; and combinations thereof.

24. A corrosion control device for a hot water system operable to implement the method of claim 1, the hot water system, having a plurality of operational protective zones ("zone" or "zones"), wherein at least two of the zones are selected zones, said device comprising:
 a receiver in communication with one or more oxidation-reduction potential ("ORP") probes, a subset of the ORP probes being activated, each activated ORP probe operable to measure a real-time ORP at operating temperature and pressure, and at least two of the selected zones including at least one of the ORP probes;
 a processor operable to interpret the measured real-time ORP communicated to the receiver from each activated ORP probe, wherein the processor either interprets the measured real-time ORP directly or interprets a calculated ORP based upon the measured real-time ORP; and
 a transmitter in communication with a feeding device operable to manage introduction of one or more active chemical species into the hot water system to affect changes in the real-time ORP, wherein the processor is operable to send an output signal through the transmitter to the feeding device, if the interpreted real-time ORP does not conform to an ORP setting.

* * * * *